Jan. 10, 1928.
S. A. CRONE
1,655,758
EMERGENCY SAFETY SUPPORTING BAR FOR RAILWAY BRAKE BEAMS
Filed March 12, 1926    3 Sheets-Sheet 1
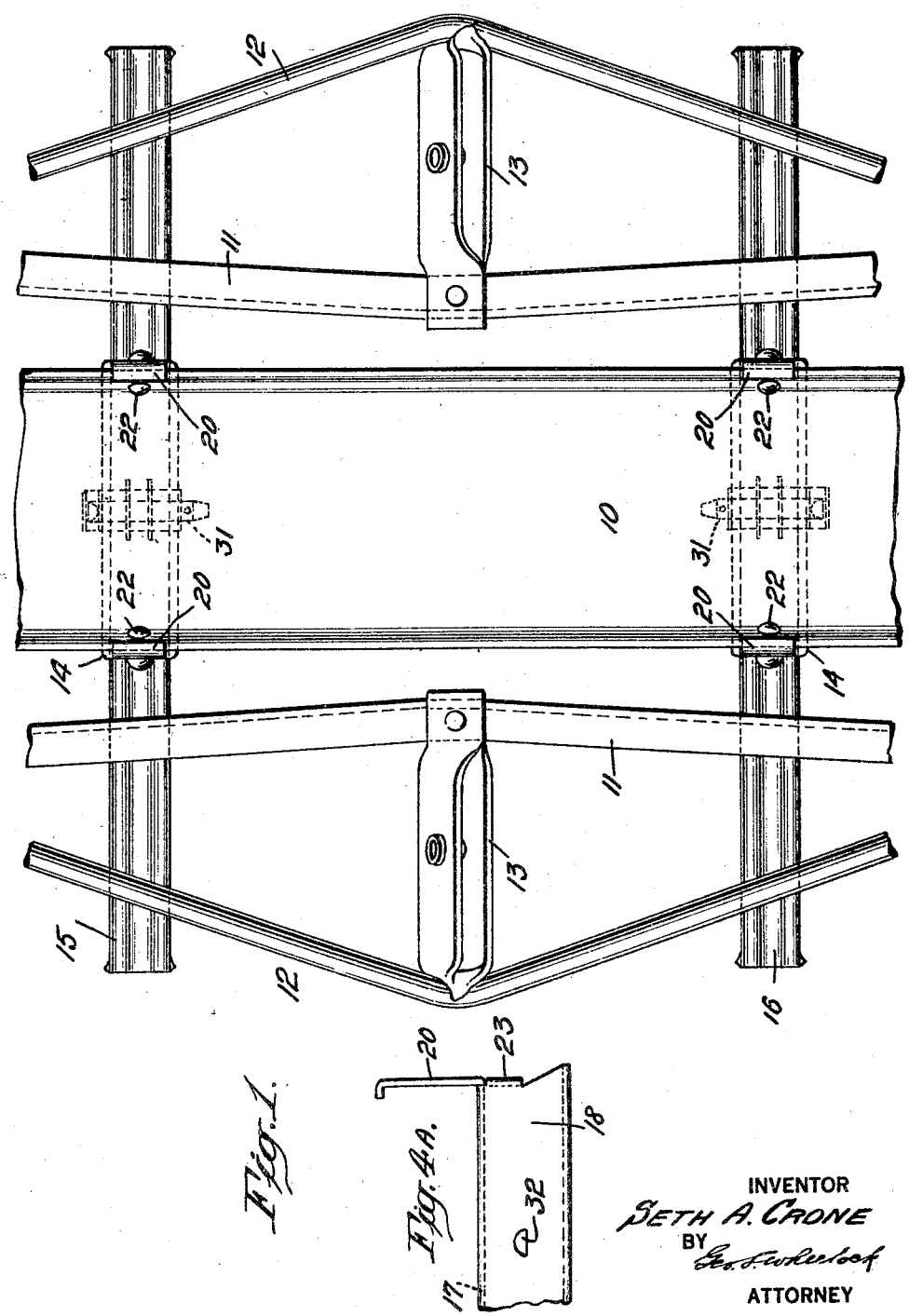
INVENTOR
SETH A. CRONE
BY
ATTORNEY

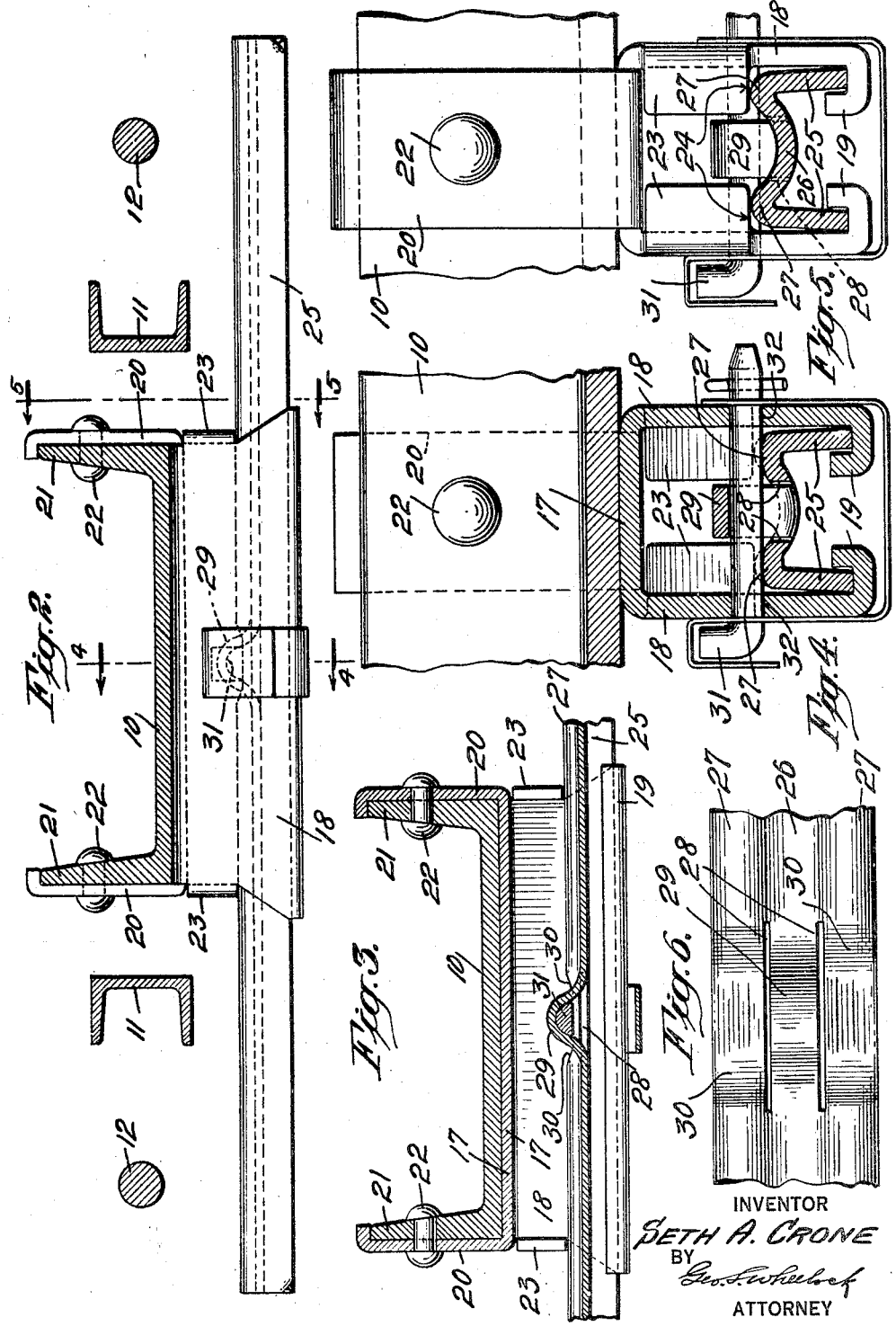

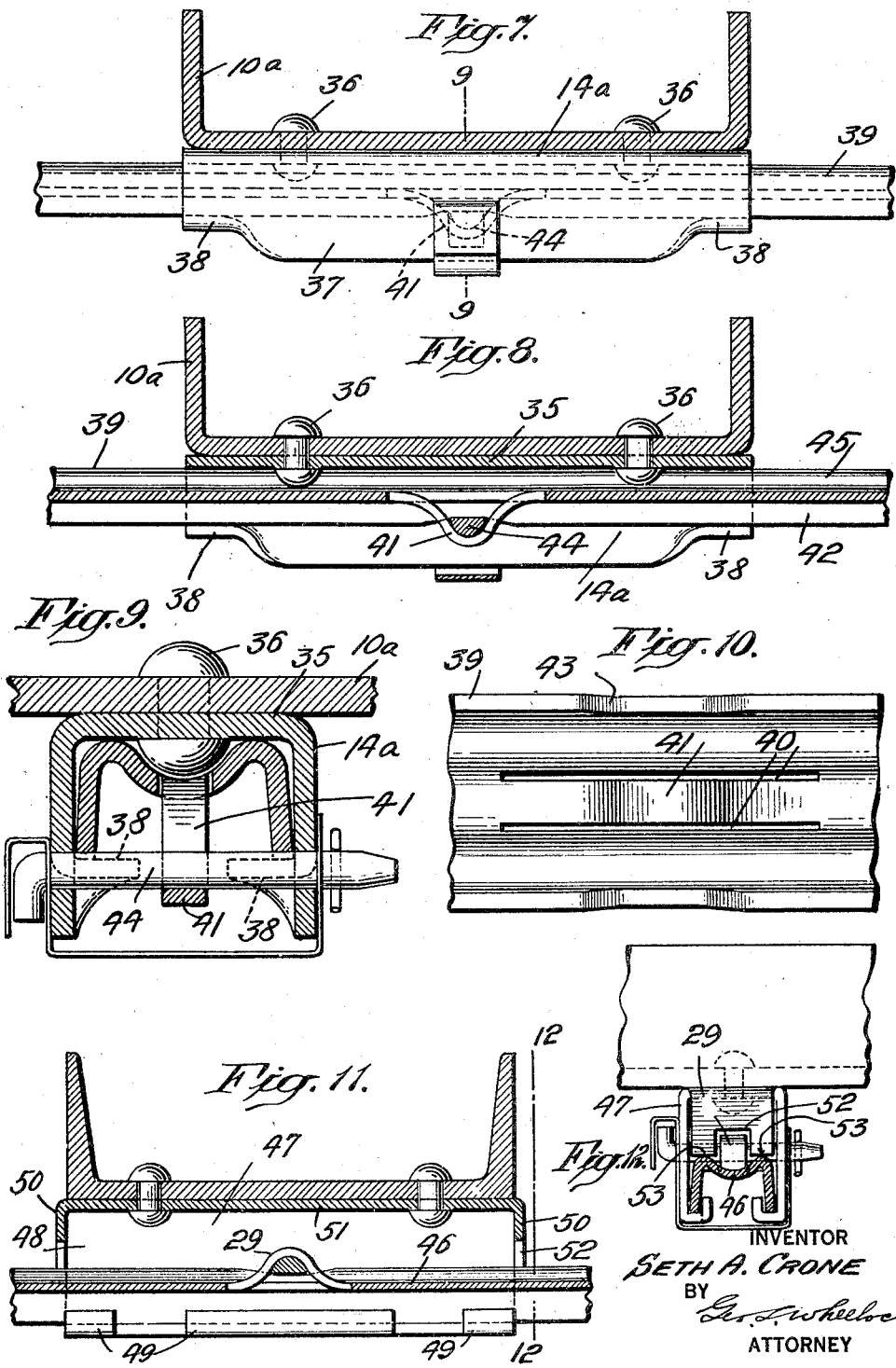

Patented Jan. 10, 1928.

1,655,758

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

EMERGENCY SAFETY SUPPORTING BAR FOR RAILWAY BRAKE BEAMS.

Application filed March 12, 1926. Serial No. 94,115.

This invention relates to improvements in railway brake beams, and has particular reference to novel means for connecting and supporting the usual auxiliary or emergency bars which extend below the brake beams to receive them in the event that said brake beams should become detached from their hangings thereby preventing, in case of accident, the brake beams from falling under the wheels to cause derailment.

An important object is to provide an emergency bar of the above mentioned character which may be interlocked with a removable coupling pin, and having supplementary frictional binding to relieve the pin of shearing stress, whereby said bar may be more positively held against accidental displacement.

Another object is to provide such a safety bar which will engage the coupling pin on opposite sides of its axis.

Another object is to provide such a device with relatively wide bearing surfaces for embracing said pin whereby to more firmly hold the parts and in such a manner as to prevent the pin from idly rotating and thereby lessening the wear of the pin.

Another object is to provide such a device which will be simple in construction, strong and durable in service, economical to manufacture, and an improvement in the art.

Other objects and advantages will be apparent from the following description when taken in connection with the accompanying drawings, wherein the invention is shown by way of illustration, and in which:

Figure 1 is a fragmentary top plan view of a car truck equipped with auxiliary or emergency supporting bars in accordance with this invention;

Figure 2 is a vertical longitudinal sectional view showing one of the spring plank brackets in elevation;

Figure 3 is a sectional view similar to Figure 2, but taken through the center of the supporting bar;

Figure 4 is a vertical transverse sectional view on the line 4—4 of Figure 2;

Figure 4$^A$ is a fragmentary side elevation of the bracket side member showing the hole for the locking pin;

Figure 5 is a sectional view on the line 5—5 of Figure 2;

Figure 6 is a top plan view of the central portion of one of the supporting bars;

Figure 7 is a view similar to Figure 2 illustrating a modified form of the invention;

Figure 8 is a longitudinal sectional view through said modified form;

Figure 9 is a vertical transverse sectional view on the line 9—9 of Figure 7;

Figure 10 is a bottom plan view of the central portion of the supporting bar of Figures 7, 8 and 9;

Figure 11 is a vertical longitudinal sectional view similar to Figure 8, but illustrating still another modification; and Figure 12 is a transverse sectional view on the line 12—12 of Figure 11.

The invention may be applied to any car truck wherein as shown in Figure 1, a spring plank 10 is disposed between a pair of brake beams 11. Cooperating with each brake beam 11 is the usual compression member 12, connected to the corresponding brake beam by a strut 13. Secured to the spring plank 10 at suitably spaced intervals are a pair of supporting brackets 14, in each of which is mounted one of the emergency or safety supporting bars 15 and 16. The bars 15 and 16 extend transversely of the spring plank 10 and are of such proportions as to extend beyond the brake beams and compression members, and spaced slightly below same. The two bars 15 and 16 are alike as are also the supporting brackets 14, and therefore only one of each of said members will be described in detail.

Referring in particular to Figures 2 to 6 inclusive, it will be seen that the bracket 14 is secured to the lower side of the spring plank 10, and includes a web member 17, having depending side portions 18 which terminate in inwardly and upwardly extending flanges 19. The web 17 extends beyond the ends of the side members 18, said extensions being upwardly bent as at 20, and capable of being secured to the side flanges 21 of the spring plank 10 by rivets 22 or other suitable fastening means. Ears 23 are preferably formed integral with the side members 18 at each end thereof and bent inwardly as best shown in Figures 4 and 5, the lower edges 24 of said ears being spaced from the flanges 19 for a purpose to be hereinafter described. The ears 23 are deflected from the side members 18 in such manner that at their juncture with the bracket members they extend along lines which are transverse of said members.

Each of the supporting bars 15 and 16 is elongated and of channel formation in cross-section, comprising flanges 25 connected together by a web 26, said web being preferably grooved longitudinally for increasing mechanical strength. The bar 15 is supported by the corresponding bracket 14, with the edges of the flange members 25 seated in the flanges 19 of the bracket, and with curved portions 27 of the web 26 in frictional engagement with lower edges 24 of the ears 23. The web 26 is provided intermediate its ends with a pair of longitudinal slits 28, which are parallel to each other, and the material of the web is oppositely deflected at the opposite sides of said slits. In the preferred embodiment the material between the slits 28 is deflected upwardly to form a loop 29, while the material at the outer sides of the slits is depressed slightly and preferably flattened as at 30. In this manner the bar 15 is formed with a transverse aperture for the passage of a locking pin 31 which extends through aligned openings 32 in the side members 18 of the bracket 14, said interlocking engagement being supplemented by the frictional binding of the lower edges 24 of ears 23 on the curved portions 27 of the safety bar.

From the foregoing it will be evident that the safety supporting bar is firmly held in the bracket 14 and that said bar will be positively interlocked by virtue of the locking pin 31, passing through the loop 29 and engaging the bearing surfaces at 30. The formation of the loop in the web of the channel member permits the locking pin to be completely embraced, but does not materially reduce the mechanical strength of the safety bar, and by virtue of the location of the ears 23 with relation to the locking pin provides a distribution of the stresses to which the mounting is subjected. It will be impossible for the supporting bar to be accidentally displaced from the bracket 14 because of this firm interlocking engagement, yet it may be easily and quickly dismounted if desired, for purposes of making repairs, by first withdrawing the locking pin and subsequently removing the bar from the support of the flange 19. In the event that one of the brake beams should become loose while the car truck is in service, it will fall downwardly and be caught by the safety or emergency bars 15 and 16 and, by thus preventing the loosened brake beam from falling upon the track, derailment of the car is avoided.

In Figures 7 to 10 inclusive a modified form of the invention is shown, wherein the supporting bracket 14ª comprises a web member 35 which is secured to the web of the spring plank 10ª by means of rivets 36. This form of bracket is necessitated by structural limitations in the car truck which require the safety bar to be positioned close up under the spring plank. Side portions 37 extend downwardly from the web 35, said side portions being inwardly flanged as at 38 at each of their ends to provide bearings for the edges of the emergency bar 39. The bar 39 is similar in cross-section to that disclosed in the preferred embodiment and is provided with a pair of parallel slits 40 between which the material is deflected downwardly to form a loop 41, and in line with said slits the flanges 42 of the bar 39 are slightly recessed as at 43 for engagement with the upper surface of the locking pin 44. In this form of the invention the longitudinal groove 45 in the web of the bar 39 provides a convenient clearance for the heads of the rivets 36 which secure the supporting bracket to the spring plank. The mode of assembly of the bar 39 in the bracket 14ª and utility of this modified form is so similar to that of the preferred embodiment as to be obvious without further detailed explanation.

In Figures 11 and 12 a further modification is illustrated wherein a supporting bar 46 of the same general construction as the bars 15 and 16 is mounted in a supporting bracket 47. The bracket 47 has its depending side portions 48 provided with spaced bearing flanges 49 at their lower edges, and has end portions 50 formed integral with the web 51 and bent downwardly therefrom as best shown in Figure 11. The portions 50 are suitably notched as at 52 to provide clearance for the loop 29 of the supporting bars and the lower edges 53 are adapted to frictionally engage the curved portions 27 of said bars.

In each form of the invention disclosed in the drawings, the locking pin is shown as being semi-circular in cross-section, this being desirable in giving a larger bearing surface of the pin against the corresponding safety bar, and furthermore in that it prevents rotation of the pin, thus lessening its liability of working loose and reducing the wear on the pin. The apertures 32 in the side members 18 are of the same shape as the cross-section of the locking pin, in the present instance being semi-circular as shown in Fig. 4ª.

From the foregoing it will be evident that improved safety or emergency supporting bars have been provided for use in railway car trucks. The construction is simple and therefore economical to manufacture, and provides a positive interlocking connection for the safety bars with their supporting brackets. The invention is, of course, susceptible of further modification and the right is herein reserved to make such changes as fall within the scope of the appended claims, without departing from the spirit of the invention.

Having thus described the invention, what is claimed is:

1. In a car truck having a spring plank and a brake beam hung adjacent thereto, emergency safety bars extending longitudinally below and normally free of the beam, each of said safety bars being slitted below the spring plank and having a portion of its material adjacent the slit deflected to provide a transverse passage, bracket members attached to the spring plank for the reception of said safety bars, and locking pins extending through the sides of the bracket members and the transverse passage in the safety bars.

2. In a car truck having a spring plank and a brake beam hung adjacent thereto, emergency safety bars extending longitudinally below and normally free of the beam, each of said safety bars being of channel formation and having a portion of its web slitted and deflected to provided a transverse passage, bracket members attached to the spring plank for the reception of said safety bars, and locking pins extending through the sides of the bracket members and the transverse passage in the safety bars.

3. In a car truck having a spring plank and a brake beam hung adjacent thereto, emergency safety bars extending longitudinally below and normally free of the beam, each of said safety bars being of channel formation and having its web provided with a pair of parallel slits, the material between the slits being deflected to form a loop, bracket members attached to the spring plank for the reception of said safety bars, and locking pins extending through the sides of the bracket members and the loop in the safety bar.

4. In a car truck having a spring plank and inside hung brake beams, an emergency safety bar extending below and normally free of the brake beams, said safety bar being of channel formation and having its web slitted and deflected to provide a passage for a transverse locking pin.

5. In a car truck having a spring plank and inside hung brake beams, an emergency safety bar extending below and normally free of the brake beams, said safety bar being of channel formation and having its web slitted and deflected to provide a passage for a transverse locking pin, a supporting bracket secured to the spring plank, said bracket having opposed flanges for engaging and supporting the safety bar, and having side members with alined openings, and a locking pin extending through the alined openings and said passage in the safety bar.

6. An emergency safety bar for a railway car truck, comprising an elongated channel member having a web, said web being provided with a pair of slits and having the material between the slits deflected to form a loop for the passage of a locking pin.

7. An emergency safety bar for a railway car truck, comprising an elongated channel member having a web, said web being slitted and having its material oppositely deflected on opposite sides of the slits to provide a passage for a locking pin and having bearing surfaces for engaging said locking pin at opposite sides of its axis.

8. An emergency safety bar for a railway car truck, comprising an elongated channel member having a web, said web being provided with a pair of slits and having the material between the slits deflected to form a loop for the passage of a locking pin, and depressed bearing surfaces provided on the channel member for engaging the locking pin at opposite sides of the loop.

9. In a car truck having a spring plank and a brake beam hung adjacent thereto, emergency safety bars extending below and normally free of the beam, bracket members attached to the spring plank and provided with supporting flanges for supporting the safety bars, locking pins for detachably securing the safety bars to the brackets, and ears integral with the brackets and extending at their junctures with the brackets along lines transverse of the said brackets, and the lower edges thereof thereby adapted for frictionally engaging portions of the web of the respective safety bars whereby to bind said bars against the supporting flanges.

10. In a car truck having a spring plank and a brake beam hung adjacent thereto, an emergency safety bar extending below and normally free of the beam, a bracket attached to the spring plank, said bracket having opposed side members provided with alined semi-circular openings and terminating in lower-edge flanges for supporting the safety bar, and a locking pin of semi-circular cross-section extending through the openings in the side members, and interlocked with the safety bar.

11. In a car truck having a spring plank and a brake beam hung adjacent thereto, an emergency safety bar extending below and normally free of the beam, a bracket attached to the spring plank, said bracket having opposed side members provided with alined semi-circular openings and terminating in lower-edge flanges for supporting the safety bar, and a locking pin of semi-circular cross-section extending through the openings in the side members to hold the safety bar in the bracket, said locking pin being engaged on both its curved and flat sides by portions of the safety bar.

12. In combination with a safety bar of the character described, a bracket for supporting said safety bar and provided with opposed side members having alined semi-circular openings, and a locking pin of semi-circular cross-section extending through said openings to lock the safety bar in place, the safety bar having a deflected portion for engaging the curved side of the locking pin, and having depressed flat portions for engaging the flat side of said pin.

SETH A. CRONE.